(12) United States Patent
Bartscherer et al.

(10) Patent No.: US 11,175,714 B2
(45) Date of Patent: Nov. 16, 2021

(54) DETECTION OF USER-FACING CAMERA OBSTRUCTION

(71) Applicant: Intel Corporation, Santa Clara, CA (US)

(72) Inventors: Marko Bartscherer, Fairview, OR (US); Aleksander Magi, Portland, OR (US); Paul S. Diefenbaugh, Portland, OR (US); Kathy T. Bui, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/729,360

(22) Filed: Dec. 28, 2019

(65) Prior Publication Data
US 2020/0159305 A1    May 21, 2020

(51) Int. Cl.
G06F 1/3206     (2019.01)
H04L 29/06      (2006.01)
G06F 1/3296     (2019.01)
G06F 1/324      (2019.01)
G06F 1/3287     (2019.01)

(52) U.S. Cl.
CPC ............ *G06F 1/3206* (2013.01); *G06F 1/324* (2013.01); *G06F 1/3287* (2013.01); *G06F 1/3296* (2013.01); *H04L 63/205* (2013.01)

(58) Field of Classification Search
CPC ...... G06F 1/3206; G06F 1/324; G06F 1/3287; G06F 1/3296; H04L 63/205
See application file for complete search history.

(56) References Cited

U.S. PATENT DOCUMENTS

| 2004/0073827 | A1* | 4/2004 | Tsirkel ................. G06F 1/3231 |
|||||713/323|
| 2008/0090537 | A1* | 4/2008 | Sutardja ............ H04W 52/0267 |
|||||455/232.1|
| 2010/0079508 | A1 | 4/2010 | Hodge et al. |
| 2012/0072167 | A1* | 3/2012 | Cretella, Jr. .......... G06F 1/1677 |
|||||702/150|
| 2012/0235790 | A1* | 9/2012 | Zhao .................. G06K 9/00288 |
|||||340/5.83|
| 2013/0176291 | A1* | 7/2013 | Leonard ............... G06F 1/1694 |
|||||345/207|
| 2014/0226837 | A1* | 8/2014 | Grokop .................. H04S 7/307 |
|||||381/103|

(Continued)

FOREIGN PATENT DOCUMENTS

EP        2696561 B1     6/2017

OTHER PUBLICATIONS

European Extended Search Report in European Patent Application No. 20197336.9 dated Mar. 22, 2021, 8 pages.

*Primary Examiner* — Gary Collins
(74) *Attorney, Agent, or Firm* — Patent Capital Group

(57) ABSTRACT

There is disclosed in one example a computing apparatus, including: a main board including a processor and memory; a user-facing (UF) camera including an auto-exposure (AE) circuit; an ambient light sensor (ALS); and a power management module communicatively coupled to the UF camera and the ALS, and including logic to detect a light input mismatch between the ALS and the AE and responsive to the detection, disable a power management function of the power management module.

20 Claims, 9 Drawing Sheets

(56) References Cited

U.S. PATENT DOCUMENTS

| | | | |
|---|---|---|---|
| 2014/0293079 A1* | 10/2014 | Milanfar | H04N 5/2171 |
| | | | 348/222.1 |
| 2015/0186093 A1* | 7/2015 | Kim | G06F 1/1632 |
| | | | 345/174 |
| 2016/0195927 A1* | 7/2016 | Lopez | G06F 3/013 |
| | | | 348/78 |
| 2016/0216753 A1* | 7/2016 | Shedletsky | G06F 1/163 |
| 2017/0180637 A1* | 6/2017 | Lautenbach | H04N 5/23222 |
| 2018/0004275 A1 | 1/2018 | Tubbs et al. | |
| 2018/0338085 A1* | 11/2018 | Kashiyama | H04N 5/2351 |
| 2019/0279365 A1* | 9/2019 | Sakuma | G06T 7/70 |
| 2019/0369661 A1* | 12/2019 | Kinoshita | G06F 1/1686 |
| 2020/0020493 A1* | 1/2020 | Weaver | H04N 5/2252 |
| 2020/0104567 A1* | 4/2020 | Tajbakhsh | G06K 9/03 |
| 2020/0228688 A1* | 7/2020 | Horiuchi | G03B 11/043 |
| 2020/0370886 A1* | 11/2020 | Chen | G01S 7/4813 |

\* cited by examiner

DETECTION OF USER-FACING CAMERA OBSTRUCTION

FIELD OF THE SPECIFICATION

This disclosure relates in general to the field of personal computing power management, and more particularly, though not exclusively, to a system and method for providing detection of user-facing camera obstruction.

BACKGROUND

Many modern computing systems include multipurpose, user-facing cameras. These cameras may provide data to on-die power management features, but may also cause privacy concerns for some users.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
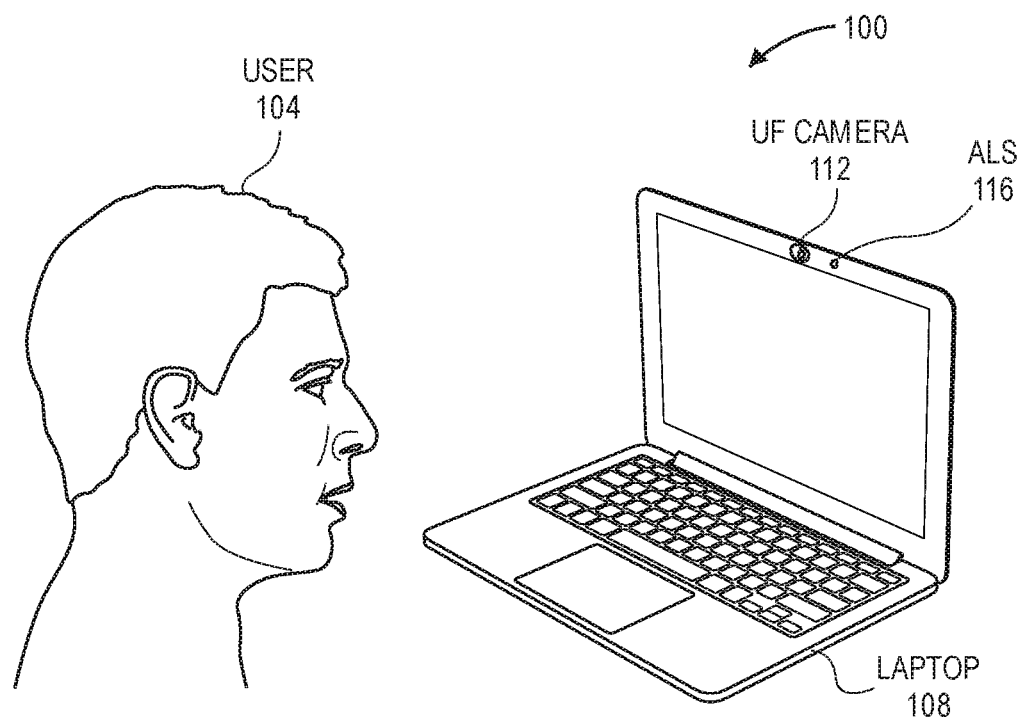
FIG. 1 is a perspective view illustration of a computing ecosystem.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples, or in some cases across different figures. This repetition is for the purpose of simplicity and clarity and does not in itself dictate a specific relationship between the various embodiments and/or configurations discussed. Different embodiments may have different advantages, and no particular advantage is necessarily required of any embodiment.

A contemporary computing platform may include a complex and multi-faceted hardware platform provided by Intel®, another vendor, or combinations of different hardware from different vendors. For example, a large data center such as may be provided by a cloud service provider (CSP), a high-performance computing (HPC) cluster, or a hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by flexibility to dynamically assign resources according to current workloads and needs. This can be accomplished, for example, by assigning a compute workload to a guest device, wherein resources such as hardware, storage, and networks are provided to a virtual machine, container, or disaggregated node by way of nonlimiting example.

In embodiments of the present disclosure, a processor includes any programmable logic device with an instruction set. Processors may be real or virtualized, local or remote, or in any other configuration. A processor may include, by way of nonlimiting example, an Intel® processor (e.g., Xeon®, Core™, Pentium®, Atom®, Celeron®, x86, or others). A processor may also include competing processors, such as AMD (e.g., Kx-series x86 workalikes, or Athlon, Opteron, or Epyc-series Xeon workalikes), ARM processors, or IBM PowerPC and Power ISA processors, to name just a few.

Power management is a consideration in many computing aspects. For example, for mobile computing devices, battery life is a premium concern for many users who want to go the maximum possible time between charges. Even for always-on devices, power management may be a concern, because users may want to minimize their environmental impact.

Modern image processing techniques are useful in a power management context. For example, one illustrative computing system is a laptop having a standalone integrated circuit that accesses a user-facing (UF) camera. This standalone circuit does not rely on the processor or the memory, and itself can operate in low power. The circuit can continuously sample the UF camera to determine whether a user appears to be in front of the UF camera and facing toward the laptop. If the user turns away from the laptop, then the screen can be dimmed automatically until the user turns back to the computer. This is on the principle that if the user is not looking at the screen on which the UF camera sits, then the user is unlikely to be actively interacting with the computer.

If the user is absent altogether, then the screen may be dimmed, go to a very low power mode or even turn off, or the computer can be locked. This can enhance user security and privacy, because the user does not have to think to lock the computer when moving away from the computer to perform other activities. An example of this is a laptop using a low-power visual sensing solution, or a companion die, which may be provided as an add-on to the computer mainboard and performs this sampling functionality.

While this functionality is useful in ensuring that the computer is not consuming power when it is not in use, some users are concerned about the privacy implications of having an always-on UF camera. Users may be particularly concerned, because the UF camera is tightly integrated into the laptop, and the control circuitry and logic for activating or deactivating the UF camera is not visible to the user.

Indeed, in some cases, there have been abuses, such as cases where businesses, enterprises, or schools have remotely activated UF cameras to spy on students or employees without their knowledge. This can and has led to legal liability for those who abuse this function.

Some computing systems include an externally available, chassis-mounted privacy switch that the user can operate to disable the UF camera on demand. This switch provides a level of comfort to users, because the user can see immediately whether the switch is on or off, and in some cases the switch is a hardware switch or other switch that is independent of the operating system and the logic, and thus cannot be overridden remotely or by software. However, some users desire an even greater level of privacy and control. For these users, a failsafe privacy guard may include a simple mechanical device, such as an adhesive slider that adhesively mounts over the camera aperture, and includes a mechanical slider that can be manipulated to physically block the view of the camera when desired. This provides the user assurance that no combination of malicious or negligent failure of electrical or software configurations can be used to bypass the user's privacy preferences.

While the use of mechanical privacy sliders and other mechanical blockers can provide users with a better sense of privacy and security, they provide challenges in the use of systems such as those that have a companion die that samples the camera to detect user presence for power management purposes. It should be noted that a companion die is provided herein is an illustration of one useful embodiment of the teachings. However, a companion die is not required. The function of the so-called "companion die" described throughout this specification could also be integrated into a system-on-a-chip (SoC), a mainboard, or even be provided within the processor or in software.

In the absence of a mechanism to accurately sense if and how the UF camera has been obscured and/or covered by an outside artifact (e.g., a stick-on privacy slider and/or privacy tape), a power management companion die may function erratically, or have undefined or undesirable behavior. The missing information from the camera can pose a significant problem for optimal utilization of a power management companion die, which may use the UF camera to detect whether the user is present and attentive to the display to optimize power settings like display brightness and other system performance parameters. Furthermore, in some cases the ambient light sensor (ALS) may not provide information to the UF camera to optimize auto exposure (AE). AE may be a key input for the user experience in the case of a power management companion die. AE data are also used for normal camera operations, as well. Furthermore, when the information is missing, the system may not provide awareness and/or feedback to the user regarding the issue. The user may simply observe erratic power management behavior and not be aware that the behavior is a result of an outside artifact obstructing the UF camera. Such erratic or undefined behavior could occur even if the camera is temporarily obstructed, such as by a thumb, debris, or other obstruction, either deliberately or inadvertently.

In some existing systems, the ALS may commonly be used to understand the ambient light (AL) conditions, and to adjust display brightness accordingly. Integrated mechanical sliders (as opposed to third-party outside artifacts) provided in laptops may provide a switch or other electrical signal that indicates that the camera has been covered. This may natively signify to the system, via physical contact, that the switch has been engaged. Professional digital single lens reflex (DSLR) cameras may signify whether a photo environment is dark or bright, and readjust AE.

However, these solutions do not address the use of outside artifacts covering a UF camera, such as on a laptop computer, desktop computer, tablet, smart phone, or other computing device. This outside artifact may not include an outside correlation mechanism to ensure that the camera and environment are coordinated. This may lead to a situation where the camera environment and the ALS are not sensing similar content, and therefore erratic or undefined behavior may be exhibited. Furthermore, in these cases, the system may not correctly optimize AE convergence and/or provide feedback to the end user if the UF camera lens is obstructed. Thus, these systems may not provide awareness and/or feedback to the user regarding the issue and potential fixes for the issue.

To provide better defined behavior and greater predictability, embodiments disclosed herein provide sensor fusion and correlation between components such as the device's ALS and the UF camera AE, to increase the speed of AE convergence and to provide user feedback. For example, if the ALS and the AE do not align, then this may indicate that the user has blocked the camera with an outside artifact. Feedback can then be provided to the user, and the user can decide whether to unblock the camera, to take advantage of the enhanced power management features, or to keep the camera blocked and dismiss the notification. In cases where the user dismisses the notification, the user may also have an option to forego future notifications, indicating the user's preference to not enable the power management features of the UF camera and power management companion die.

The disclosure herein allows the system to compute a starting value via the ALS to increase the speed of AE convergence. The system may also notify the end user and/or an application driver if the camera has been covered, damaged, and/or altered. This provides the end user a more successful and seamless experience with a power management companion die, and is useful for common camera usages to increase the speed of AE and clients.

A system and method for providing detection of user-facing camera obstructions will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a perspective view illustration of a computing ecosystem 100. Within computing ecosystem 100, a user 104 operates a computing device such as a laptop 108. Laptop 108 is provided here as an illustrative and representative embodiment. However, this illustration is nonlimiting. For example, instead of or in addition to laptop 108, user 104 could operate a desktop computer, a tablet, a smart phone, or any other suitable computing device. Thus, in this illustration, laptop 108 should be understood to stand for the class of computing devices that may be operated according to the teachings of the present specification.

In this embodiment, laptop 108 has a UF camera 112. Not shown in this FIGURE, but illustrated in greater detail in connection with other FIGURES, laptop 108 may also include a companion die, such as a power management companion die.

The power management companion die of laptop 108 may be configured to reduce power if user 104 is not in front of the computer or does not appear to be attentive to laptop 108. This can be accomplished, for example, when the companion die continuously samples UF camera 112, to determine whether user 104's face is visible in front of UF camera 112. If user 104 is not seen in front of UF camera 112, then a power saving operation may be taken. Furthermore, if user 104 is seen in front of UF camera 112, but user 104's head is oriented in such a manner that user 104 does not appear to be attentive to laptop 108, then a power saving action may be taken, which may be the same or a different power saving action from the power saving action taken when user 104 is not present at all.

However, user 104 may be concerned about privacy, and may wish to block UF camera 112 in a manner that is not dependent on laptop 108. For example, user 104 may not trust that turning off UF camera 112 actually eliminates sampling. In the case of a power management companion die, this may in fact be true. Although the power saving companion die does not export any data out of laptop 108, or even outside of the companion die itself, it does continue to sample images from UF camera 112. While it would be extremely difficult for an attacker to somehow use the sampling to compromise the privacy or security of user 104, some users are simply opposed to the idea of a camera looking at them. In that case, user 104 may wish to completely block UF camera 112. For example, user 104 may use a physical obstruction such as a piece of tape, a thumb, or some other object to block UF camera 112. In cases where the user prefers to selectively block or unblock UF camera 112, the user may apply a non-integrated aftermarket privacy apparatus such as a stick-on privacy slider, as illustrated in more detail in FIGS. 5a and 5b. With the use of a stick-on privacy slider, the user has complete independent control of the ability of UF camera 112 to see or not see.

However, the user's application of such a stick-on privacy slider may compromise the utility of the power management companion die. Because the power management companion die is unable to sample camera 112 to determine whether user 104 is facing laptop 108, no power management features can be performed. Furthermore, if the view of UF camera 112 is obstructed, then the power management companion die may erroneously conclude that the user is not present, because the user is not visible. In that case, the companion die may exhibit undefined or erratic behavior, such as continuously switching to power saving mode, switching out of power saving mode when the user interacts with the machine, switching back to power saving mode when the user stops interacting with the machine, and so on. While some of this switching back and forth can be eliminated by a frequency limiter (e.g., one that limits the number of switches back and forth within a defined time period), the utility of the companion die is greatly enhanced when this power saving "jitter" never starts in the first place.

To limit such jitter, the companion die may access data from an ALS 116, and compare the ALS value to an expected AE value for UF camera 112, based on light reaching UF camera 112. If the ALS value is out of alignment with the UF camera's AE value, then it may be inferred that UF camera 112 has been blocked, such as by a non-integrated aftermarket privacy slider.

Figure 2:
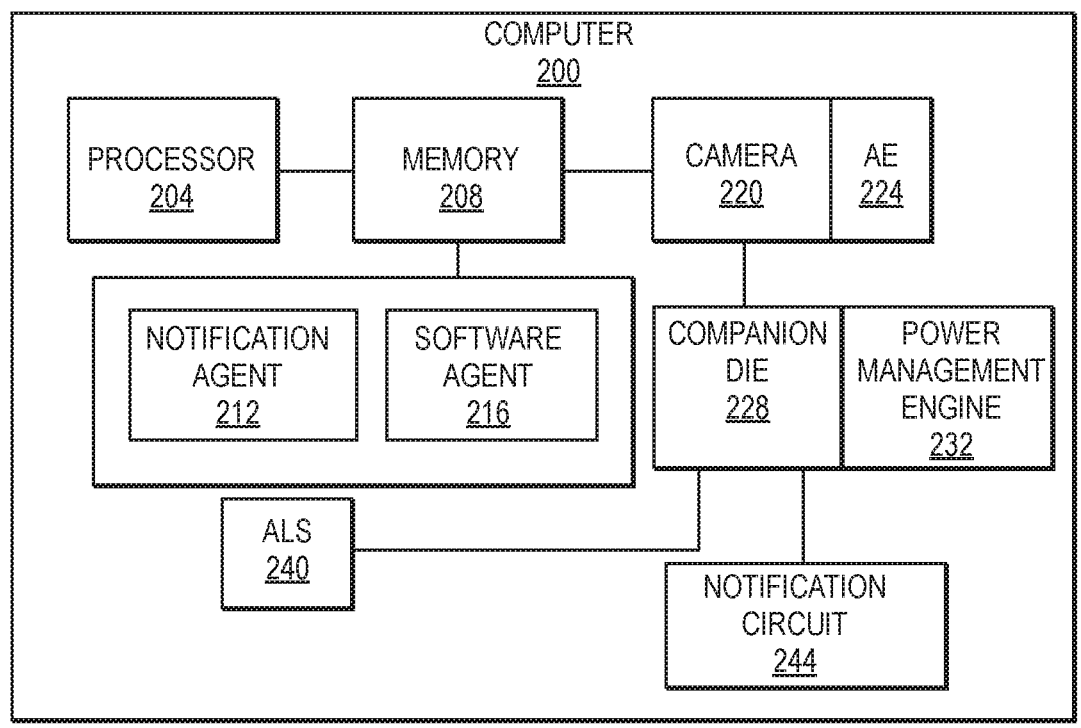
FIG. 2 is a block diagram of a hardware platform.

FIG. 2 is a block diagram of a hardware platform, herein referred to as computer 200. Computer 200 illustrates certain limited details of the hardware platform to facilitate discussion of the novel teachings of the present specification. To simplify the disclosure of computer 200, certain other elements of the hardware platform are not included in this FIGURE. However, for a more detailed view of a hardware platform, including selected elements omitted from FIG. 2, reference is made to FIG. 10, where a hardware platform is illustrated in greater detail.

In this example, computer 200 includes a processor 204 and a memory 208. Aspects of processor 204 and memory 208 are illustrated in more detail in connection with FIG. 10. Processor 204 and memory 208 may form the processing core of computer 200, and may reside on a mainboard.

Also available in computer 200 are camera 220, which may be a UF camera and which may include an AE module 224. A companion die 228 includes a power management engine 232, which may include circuitry and/or logic to provide power management functions to computer 200. An ALS 240 is also available to provide a value for ambient light.

As discussed above, companion die 228 may provide power management functions to computer 200, and in some cases, these power management functions are provided independently of processor 204 and memory 208. Companion die 228 may also have independent access to camera 220 and ALS 240. In particular, to perform its power management function, companion die 228 may have access to camera 220, even when camera 220 is "off" with respect to software agents 216 that may use camera 220. However, in at least some embodiments, companion die 228 lacks any direct or indirect access to memory 228. Thus, even though companion die 228 may sample from camera 220, companion die 228 does not provide any data to the system memory 208. This ensures that even when companion die 228 is sampling camera 220, it is not compromising user security or privacy.

In some cases, companion die 228 may have dedicated communication lines that provide limited information to computer 200, that is accessible by processor 204. This could include, for example, the power state managed by companion die 228, so that processor 204 can react to the power state provided by companion die 228. Furthermore, companion die 228 may have some limited communication that informs companion die 228 of the operational state of computer 200, such as whether user input is currently being received, or other information that companion die 228 may need to operate power management engine 232. Furthermore, in some embodiments, companion die 228 provides hardened controls, by which the user can completely disable camera 220, including disabling the power management function of companion die 228. This can help to ensure that a user has complete and final control over the operation of computer 200.

However, as discussed above, some users are not satisfied even when companion die 228 provides hardened privacy controls. These users may wish to have complete independent mechanical control over the availability of camera 220. In that case, the user may physically obstruct camera 220, such as with an aftermarket privacy slider. If the user applies such a mechanical slider over camera 220, AE circuit 224 will detect the reduced light available to camera 220. Thus, like a human iris, AE 224 will fully open to expose the maximum available light to camera 220. However, even with AE 224 fully opening the iris of camera 220, it still will not have a good view of the user, because the view is completely blocked.

However, power management engine 232 of companion die 228 may also sample ALS 240. If power management engine 232 determines that ALS 240 indicates sufficient ambient light, but AE 224 is at maximum exposure, then companion die 228 may determine that camera 220 has been obstructed.

In this case, companion die 228 may disable some or all features of power management engine 232, to ensure that computer 200 does not enter low power states responsive to this obstruction. In some embodiments, in any case where AE 224 opens to maximum exposure, power management engine 232 may disable some or all functions. For example, even if ALS 240 matches AE 224, the lack of ambient light may make it difficult to properly sample camera 220 to determine whether the user is present and attentive. In that case, it may possibly be best to simply disable the automatic power management functions of companion die 228, until more light is available to view the user.

In the particular case where ALS 240 and AE 224 are indicative of substantially different levels of ambient light, companion die 228 may determine that camera 220 has been obstructed. In that case, companion die 228 may provide a minimal signal to notification circuit 244. Notification circuit 244 may include, for example, an external or chassis-mounted visible indicator that the camera has been obstructed, and that power management features are not currently available. This could include, by way of illustrative and nonlimiting example, a simple or stylized light emitting diode (LED) indicator visible on the bezel or on the keyboard of computer 200.

In the same or a different embodiment, companion die 228 may also provide a minimal notification to processor 204, or to some other part of the mainboard of computer 200, so that software is aware of the obstruction of UF camera 220. In that case, processor 204 may launch a notification agent 212, which can provide a software-based notification of the obstruction.

Figure 3:
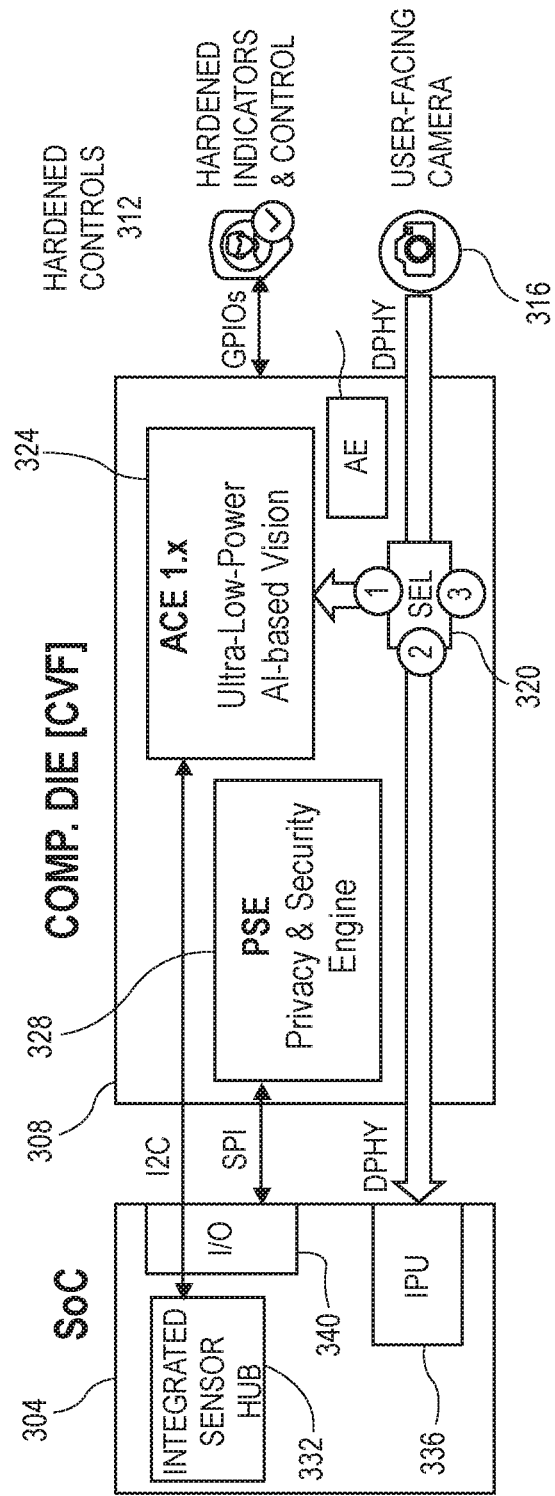
FIG. 3 illustrates selected elements of a computing system.

FIG. 3 illustrates selected elements of a computing system. FIG. 3 illustrates certain aspects in different detail than in other FIGURES. As in the case of FIG. 2, the system illustrated in FIG. 3 may be more fully understood with reference to FIG. 2 and/or FIG. 10.

In the illustration of FIG. 3, a system-on-a-chip (SoC) 304 provides the main operational capability, including the processor and memory, or support therefor. SoC 304 includes an I/O block 340, which communicates via serial peripheral interface (SPI), and an integrated sensor hub 332, which communicates via an inter-integrated circuit (I2C). An integrated power unit (IPU) 336 communicates via a D-PHY physical layer.

Companion die 308 includes a power management engine 324. This provides ultra-low power, artificial intelligence (AI)-based vision that samples UF camera 316 and determines whether the user is present. The AI may include a machine learning (ML) model and/or heuristic algorithms that learn inputs that indicate that the user is present and attentive, versus when the user is not present and attentive.

Privacy and security engine 328 is provided to ensure user privacy and security. Hardened indicators and controls 312 communicate with companion die 308 via general purpose input/output (GPIO) to ensure that the user has final control over the state of companion die 308, including power management engine 324.

A selector 320, which may be a defined multiplexer (MUX) or other selector, selects between providing camera inputs to power management engine 324, and/or providing camera inputs to IPU 336. For example, if the user operates a certain security setting, no data are provided to IPU 336, and power management engine 324 maintains sole control over the power management function.

Although the ALS 240 is not visible in FIG. 3, the ALS may also communicate data via integrated sensor hub (ISH) 332. Thus, companion die 308 can receive ALS data via ISH 332, and power management engine 324 may include logic to compare data from the ALS received via ISH 332 to data from AE circuit 326. If power management engine 324 detects a substantial mismatch between AE 326 and the ALS value, then certain power management functions may be modified or disabled, as taught throughout this specification.

Companion die 308 may have a preference for maintaining the power management functions of companion die 308, when possible. This is because empirical data indicate that companion die 308 can save on the order of 15 to 20% by reducing power during "short idle" phases when the user is not immediately or directly interacting with the computer. This power saving provides a direct and immediate benefit to the users themselves, because users generally prefer to have greater battery life available from their devices.

Figure 4:
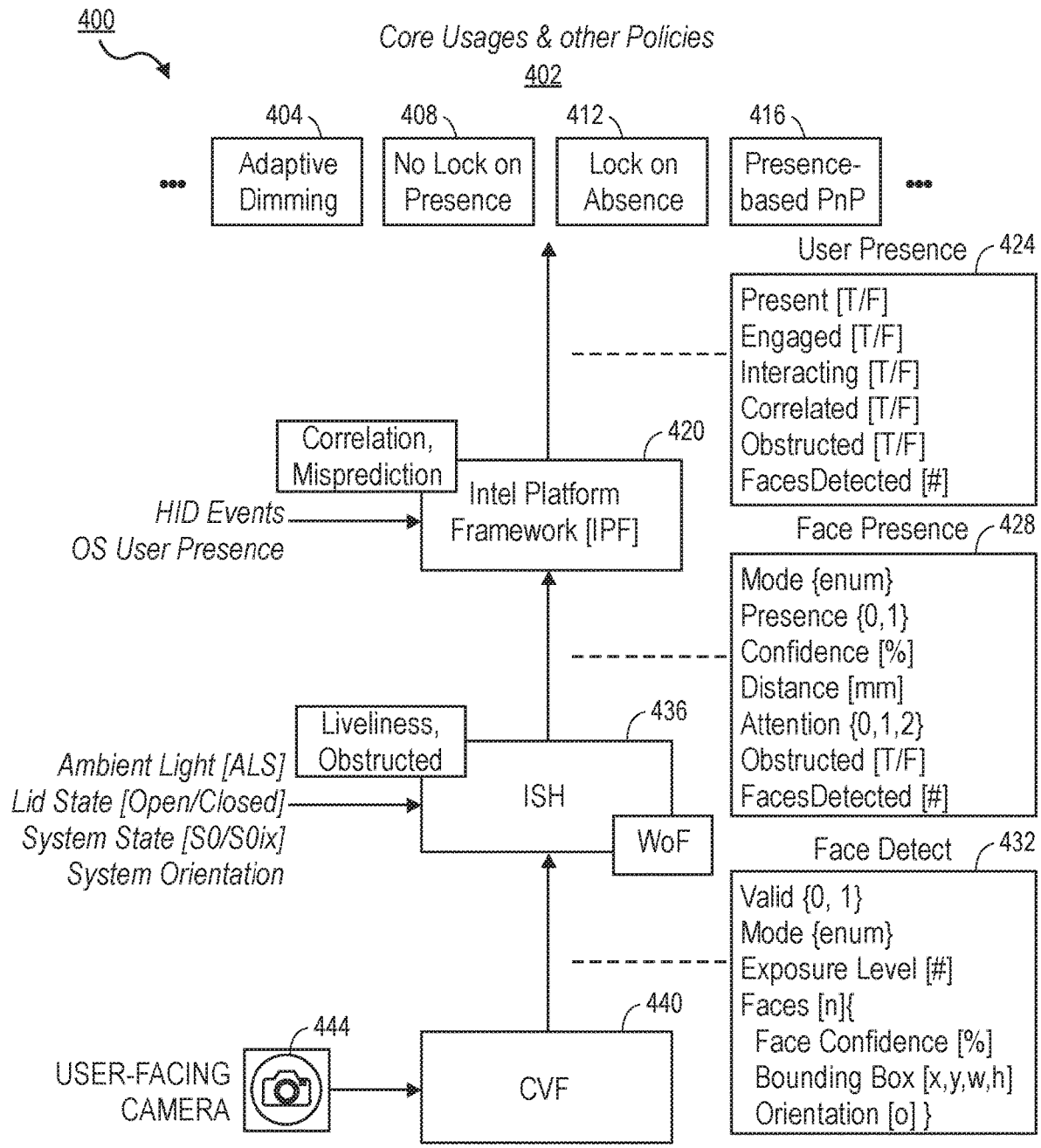
FIG. 4 illustrates logic flows for a power management engine.

FIG. 4 illustrates logic flows for a power management engine. If the UF camera is covered by an outside or non-integrated object like a stick-on privacy slider, the companion die may correlate the ALS value to the AE value, or more generally to what the UF camera can see. If these do not correlate, the end user, relevant app, and/or client system can receive a notification that the camera has been covered and/or is inoperable.

Core usage and other policies 402 may be provided as a metablock. These include, by way of illustrative and non-limiting example, adaptive dimming 404, no lock on presence 408, lock on absence 412, and presence-based on plug-and-play 416. In some cases, these policies are user selectable via a user interface which may be graphical, or via mechanical means such as external switches.

A platform framework 420 may receive human interface device (HID) events or operating system (OS) user prediction events.

An ISH 436 may provide a "wake on face" policy, and may include data such as ambient light state from ALS, lid state (open/closed), system state (SO/SOix), or system orientation.

Companion die 440 may sample UF camera 444. Companion die 440 may then make predictions about user presence 424, face presence 428, and face detect 432.

In the case of user presence 424, the module may compute a Boolean present flag, a Boolean engaged flag, a Boolean interacting flag, a Boolean correlated flag (e.g., to determine whether AE is correlated to ALS), and/or a Boolean obstructed flag. User presence engine 424 may also determine a number of faces detected, which can indicate whether one user is operating the machine individually, or whether multiple users are observing the machine.

A face presence engine 428 may compute values such as an enumerated mode, a Boolean presence, a percent confidence, an estimated distance to the user, a user's attention state, a Boolean obstructed state, and the number of faces detected.

The distance value described above may be used to determine whether the user is close to, or far from, the computer. For example, if the camera sees a user's face, but the user appears to be 10 feet away from the machine, then it is less likely that the user is directly interacting with the computer. Rather, the user may simply be in the room and not interacting, in which case it may be safe to enter a lower power mode, according to policy.

The attention value is illustrated as an enumerated value of 0, 1, or 2. In this case, a user that is looking directly at the screen has attention value 2. A user that is not at all looking at the screen has an attention value of 0. As the user turns to or from the screen, the attention value may pass through 1, indicating that the user has turned completely to or completely from the screen. In some cases, the power management policy may enter the low power mode only if the user passes from state 2, through state 1, to state 0. The power management mode may be exited only if the user passes from state 0, through state 1, to state 2.

A face detect engine 432 includes a Boolean valid flag, an enumerated mode, an exposure level value (i.e., provided by the AE circuit), and a number of faces. For each face, the face detect module 432 may detect a face confidence percentage, and it may compute coordinates for a bounding box and an approximate degree orientation for the user space, which can be used to calculate the attention level of the user.

Figure 5A:
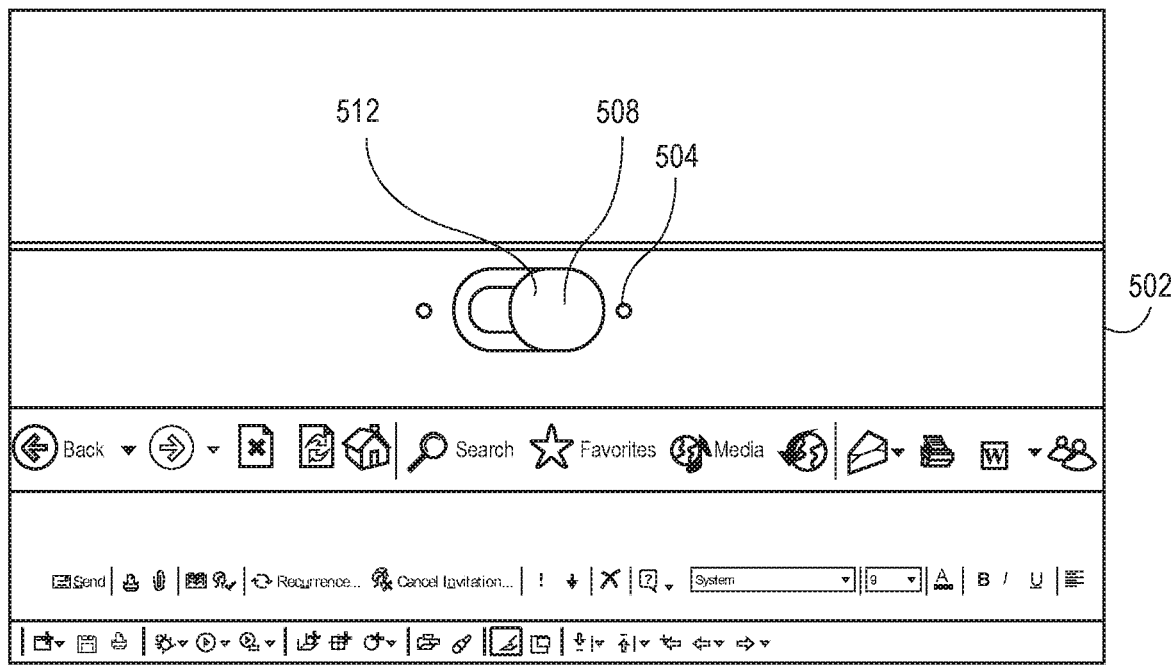
FIGS. 5a and 5b illustrate the use of a stick-on privacy slider in a laptop computer.
Figure 5B:
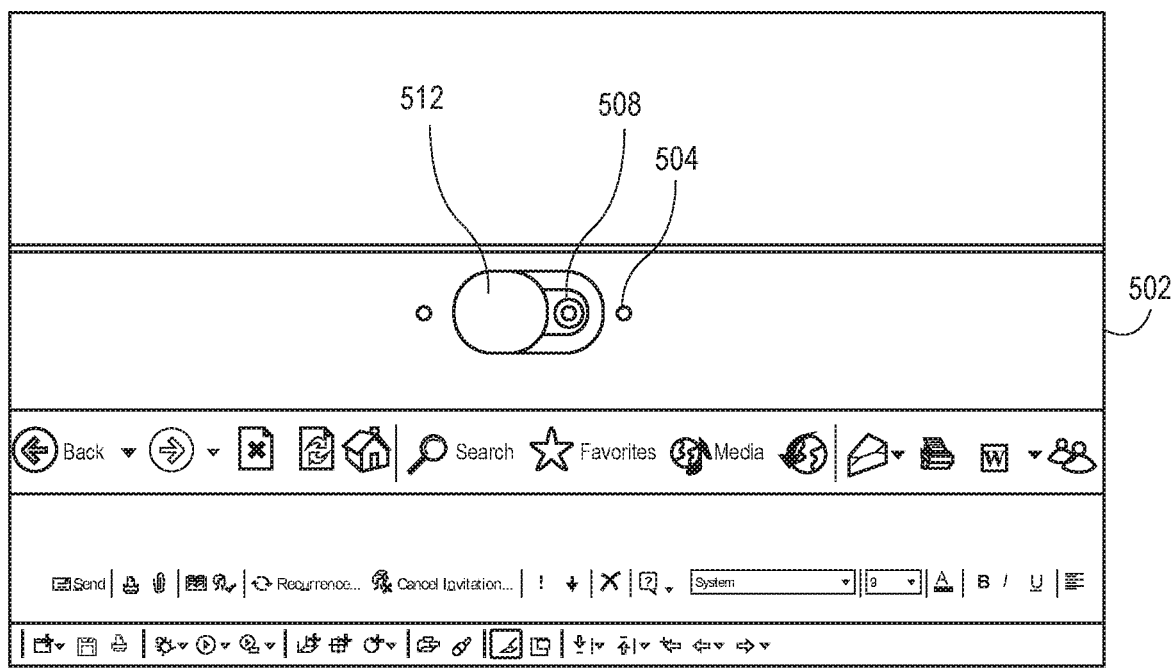

FIGS. 5*a* and 5*b* illustrate the use of a stick-on privacy slider in a laptop computer. Visible in FIGS. 5*a* and 5*b* are a UF camera 508, an ALS 504, and a stick-on privacy slider 512. In the illustrated example, UF camera 508 and ALS 504 are located on bezel 502.

FIG. 5*a* illustrates a stick-on privacy slider in a closed position obstructing UF camera 508. In this case, an AE value for an AE circuit of UF camera 508 will mismatch an ambient light value from ALS 504.

FIG. 5*b* illustrates an example where stick-on privacy slider 512 is in an opened state. When the camera has been uncovered, or if it is not covered in day-to-day use, the AE of the camera can be optimized by the available ALS sensor, which can provide an increase of AE speed. An ambient light value provided by the ALS can be used as a starting value to increase the speed to AE convergence. Not only is this helpful for the power management functions of a companion die, but it is also useful for common camera usages to increase the speed of AE in client software.

Figure 6:
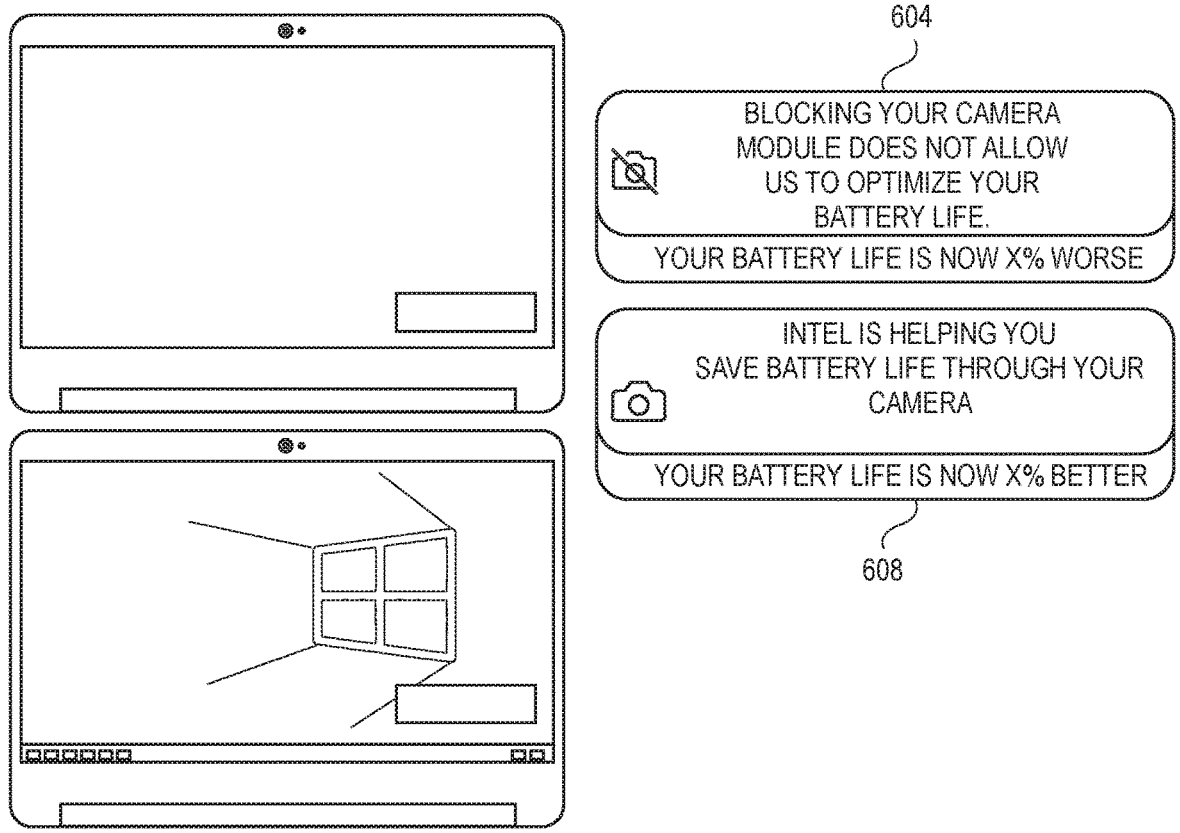
FIG. 6 illustrates that an on-screen notification could be provided, such as via a Windows 10 pop-up notification.
Figure 7:
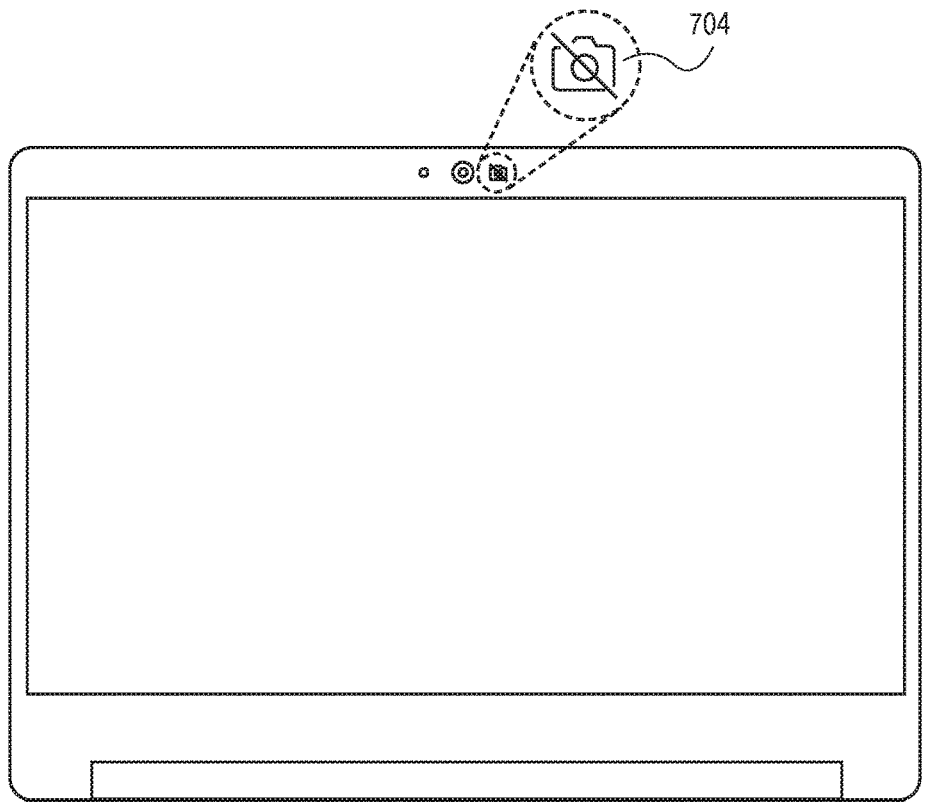
FIG. 7 illustrates that a stylized light could be provided on the bezel.
Figure 8:
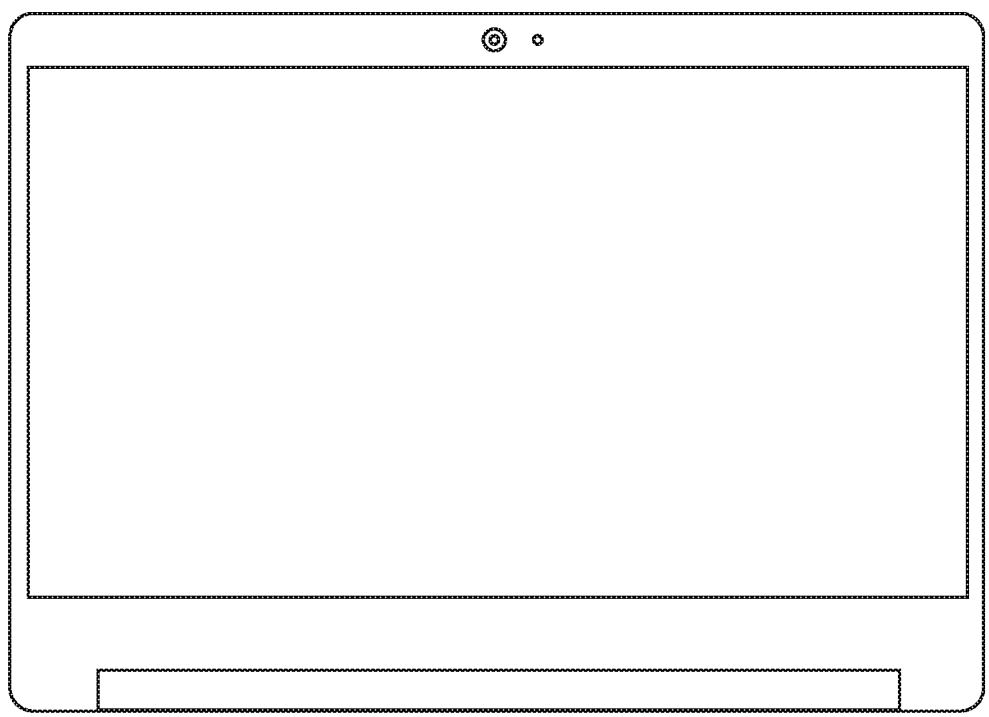
FIG. 8 illustrates that a similar stylized or non-stylized light emitting diode (LED) could be provided on the keyboard.
Figure 8:
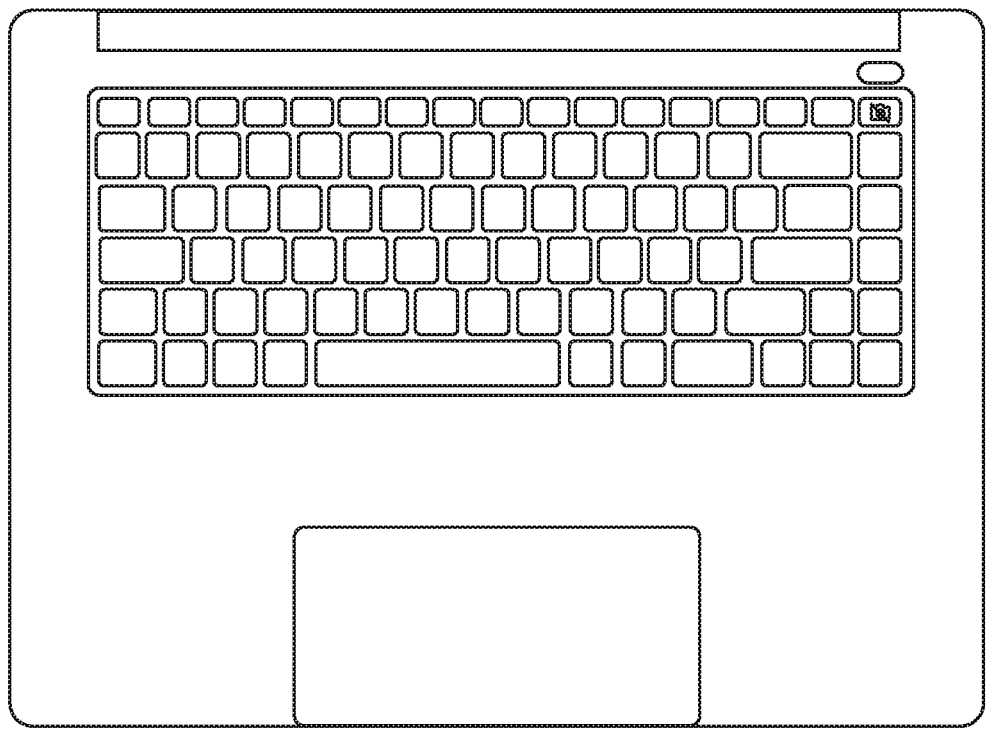

As discussed above, if the correlation does not align, the user can be notified via a notification circuit and/or notification system bound software. FIGS. 6, 7, and 8 illustrate notification options.

FIG. 6 illustrates that an on-screen notification could be provided, such as via a Windows 10 pop-up notification. This could be a notification that the camera has been obstructed (604). Once the camera has been unobstructed, a notification is provided to this effect (608).

FIG. 7 illustrates that a stylized light 704 could be provided on the bezel. This could be a stylized LED, colored red for example, with a camera having a cross through it. When this red LED lights up, it indicates to the user that the camera has been obstructed, and implies therefore that the power management functions of the companion die are unavailable.

FIG. 8 illustrates that a similar stylized or non-stylized LED could be provided on the keyboard. In some cases, this could be in conjunction with a function key that enables or disables the camera. When the camera is disabled, the red LED lights up. When the camera is re-enabled, the red LED dims.

Figure 9:
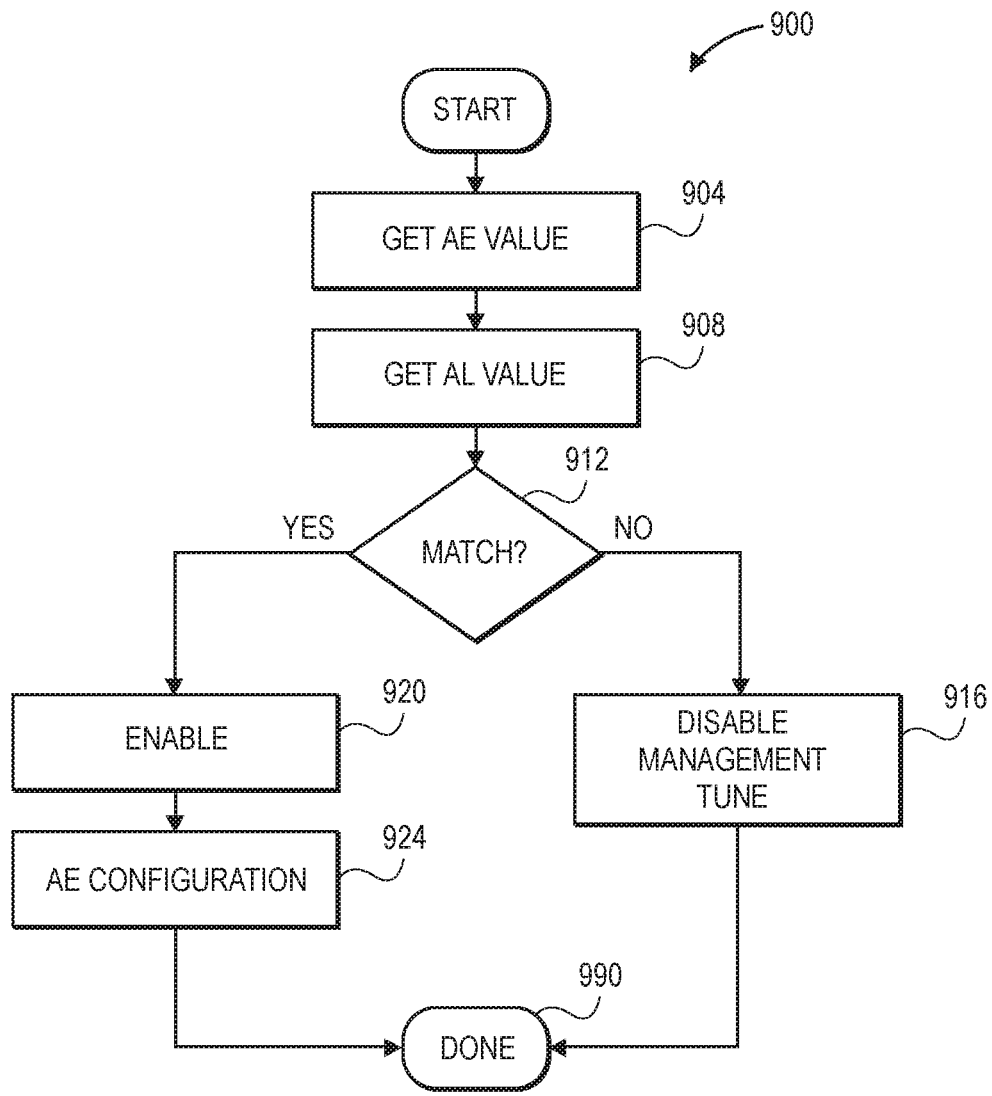
FIG. 9 is a flowchart of a method that may be performed, for example, by a companion die, by power management software, or by some other module.

FIG. 9 is a flowchart of a method 900 that may be performed, for example, by a companion die, by power management software, or by some other module. Method 900 is used to determine whether the camera is available for power management functions, and if the camera is available and unobstructed to provide AE convergence for the camera, which aids in both power management function and in user software that utilizes the camera.

Starting block 904, the power management module first gets an AE value from the camera, itself.

In block 908, the power management module gets an AL value from an ALS sensor.

In block 912, the module determines whether there is a match between the AE value and the AL value. Note that a match here does not necessarily mean an identical value. Indeed, the values for AE and AL in an unconditioned state may be in different units, and a numerical match would never be expected. Rather, the module may correlate the AE value to the AL value, to determine if they are both representative of a similar ambient lighting state. This may include converting to units, such as converting the AE value to a corresponding AL value, or converting the AL value to a corresponding AE value, or converting both to intermediate units.

Furthermore, a match or a mismatch may not need to be based on exact match or mismatch, but may be based on match or mismatch within a threshold.

If there is a mismatch, then in block 916, the power management module may disable at least some power management functions that are based on camera sampling. Alternatively, these may be modified rather than disabled. In block 990, the method is done.

Returning to decision block 912, if there is a match, then in block 920, the power management functions are enabled or modified back to a fully operational state, as necessary.

In block 924, optionally based on the ALS value, the power management module may also perform AE convergence on the camera AE circuit. This not only helps the power management module to get better samples for its power management functions, but can also provide better camera management for software functions that use a camera.

In block 990, the method is done.

Figure 10:
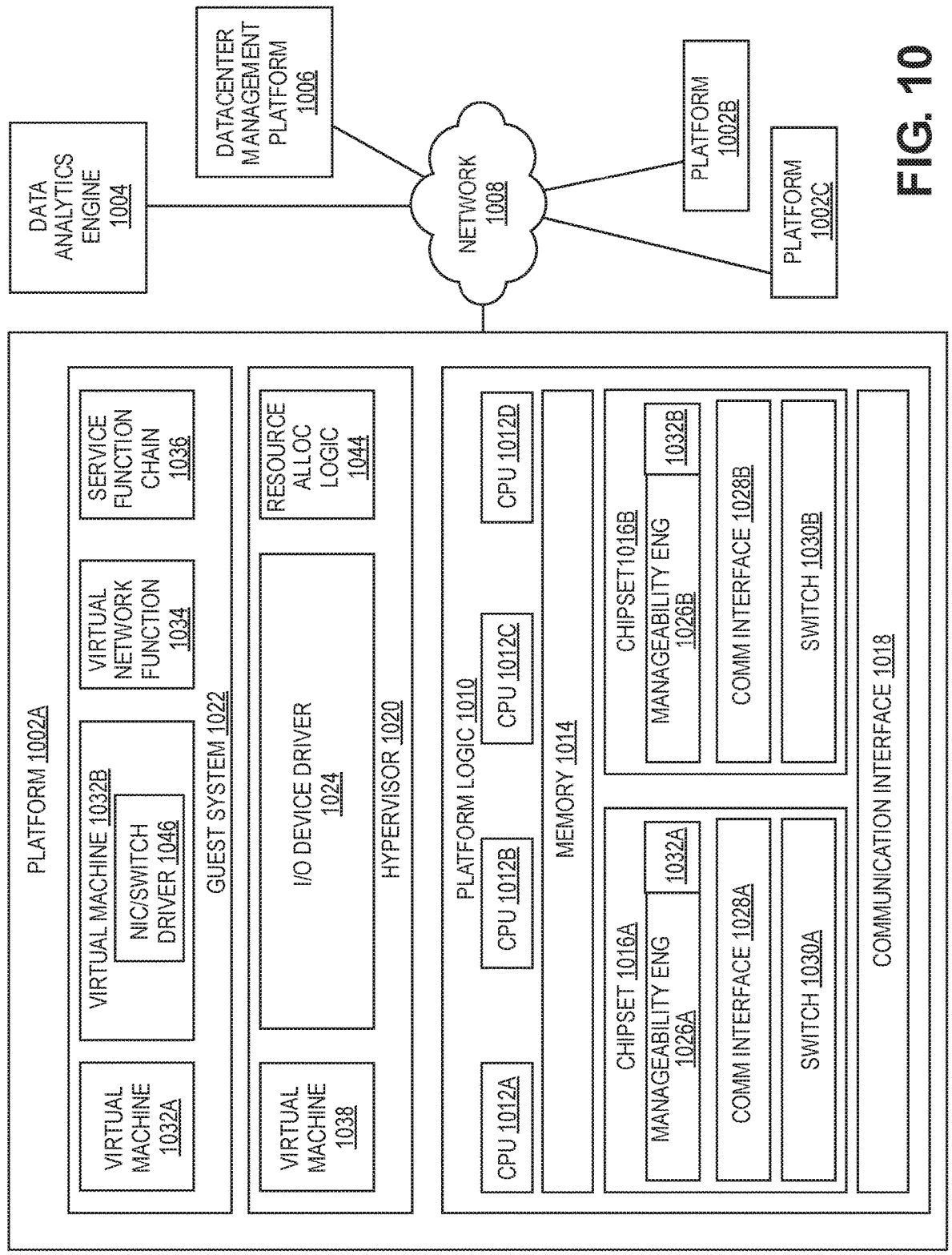
FIG. 10 is a block diagram of components of a computing platform.

FIG. 10 is a block diagram of components of a computing platform 1002A. In at least some embodiments, computing platform 1002A may be configured or adapted to provide detection of user-facing camera obstruction, according to the teachings of the present specification.

In the embodiment depicted, hardware platforms 1002A, 1002B, and 1002C, along with a data center management platform 1006 and data analytics engine 1004 are interconnected via network 1008. In other embodiments, a computer system may include any suitable number of (i.e., one or more) platforms, including hardware, software, firmware, and other components. In some embodiments (e.g., when a computer system only includes a single platform), all or a portion of the system management platform 1006 may be included on a platform 1002. A platform 1002 may include platform logic 1010 with one or more central processing units (CPUs) 1012, memories 1014 (which may include any number of different modules), chipsets 1016, communication interfaces 1018, and any other suitable hardware and/or software to execute a hypervisor 1020 or other operating system capable of executing workloads associated with applications running on platform 1002. In some embodiments, a platform 1002 may function as a host platform for one or more guest systems 1022 that invoke these applications. Platform 1002A may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an internet of things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 1006, hypervisor 1020, or other operating system) of computer platform 1002A may assign hardware resources of platform logic 1010 to perform workloads in accordance with the stress information. In some embodiments, self-diagnostic capabilities may be combined with the stress monitoring to more accurately determine the health of the hardware resources. Each platform 1002 may include platform logic 1010. Platform logic 1010 comprises, among other logic enabling the functionality of platform 1002, one or more CPUs 1012, memory 1014, one or more chipsets 1016, and communication interfaces 1028. Although three platforms are illustrated, computer platform 1002A may be interconnected with any suitable number of platforms. In various embodiments, a platform 1002 may reside on a circuit board that is installed in a chassis, rack, or other suitable structure that comprises multiple platforms coupled together through network 1008 (which may comprise, e.g., a rack or backplane switch).

CPUs 1012 may each comprise any suitable number of processor cores and supporting logic (e.g., uncores). The cores may be coupled to each other, to memory 1014, to at least one chipset 1016, and/or to a communication interface 1018, through one or more controllers residing on CPU 1012 and/or chipset 1016. In particular embodiments, a CPU 1012 is embodied within a socket that is permanently or removably coupled to platform 1002A. Although four CPUs are shown, a platform 1002 may include any suitable number of CPUs.

Memory 1014 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 1014 may be used for short, medium, and/or long-term storage by platform 1002A. Memory 1014 may store any suitable data or information utilized by platform logic 1010, including software embedded in a computer-readable medium, and/or encoded logic incorporated in hardware or otherwise stored (e.g., firmware). Memory 1014 may store data that is used by cores of CPUs 1012. In some embodiments, memory 1014 may also comprise storage for instructions that may be executed by the cores of CPUs 1012 or other processing elements (e.g., logic resident on chipsets 1016) to provide functionality associated with the manageability engine 1026 or other components of platform logic 1010. A platform 1002 may also include one or more chipsets 1016 comprising any suitable logic to support the operation of the CPUs 1012. In various embodiments, chipset 1016 may reside on the same die or package as a CPU 1012 or on one or more different dies or packages. Each chipset may support any suitable number of CPUs 1012. A chipset 1016 may also include one or more controllers to couple other components of platform logic 1010 (e.g., communication interface 1018 or memory 1014) to one or more CPUs. In the embodiment depicted, each chipset 1016 also includes a manageability engine 1026. Manageability engine 1026 may include any suitable logic to support the operation of chipset 1016. In a particular embodiment, a manageability engine 1026 (which may also be referred to as an innovation engine) is capable of collecting real-time telemetry data from the chipset 1016, the CPU(s) 1012 and/or memory 1014 managed by the chipset 1016, other components of platform logic 1010, and/or various connections between components of platform logic 1010. In various embodiments, the telemetry data collected includes the stress information described herein.

In various embodiments, a manageability engine 1026 operates as an out-of-band asynchronous compute agent which is capable of interfacing with the various elements of platform logic 1010 to collect telemetry data with no or minimal disruption to running processes on CPUs 1012. For example, manageability engine 1026 may comprise a dedicated processing element (e.g., a processor, controller, or other logic) on chipset 1016, which provides the functionality of manageability engine 1026 (e.g., by executing software instructions), thus conserving processing cycles of CPUs 1012 for operations associated with the workloads performed by the platform logic 1010. Moreover the dedicated logic for the manageability engine 1026 may operate asynchronously with respect to the CPUs 1012 and may gather at least some of the telemetry data without increasing the load on the CPUs.

A manageability engine 1026 may process telemetry data it collects (specific examples of the processing of stress information are provided herein). In various embodiments, manageability engine 1026 reports the data it collects and/or the results of its processing to other elements in the computer system, such as one or more hypervisors 1020 or other operating systems and/or system management software (which may run on any suitable logic such as system management platform 1006). In particular embodiments, a critical event such as a core that has accumulated an excessive amount of stress may be reported prior to the normal interval for reporting telemetry data (e.g., a notification may be sent immediately upon detection).

Additionally, manageability engine 1026 may include programmable code configurable to set which CPU(s) 1012 a particular chipset 1016 manages and/or which telemetry data may be collected.

Chipsets 1016 also each include a communication interface 1028. Communication interface 1028 may be used for the communication of signaling and/or data between chipset 1016 and one or more I/O devices, one or more networks 1008, and/or one or more devices coupled to network 1008 (e.g., system management platform 1006). For example, communication interface 1028 may be used to send and receive network traffic such as data packets. In a particular embodiment, a communication interface 1028 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 1016 (e.g., manageability engine 1026 or switch 1030) and another device coupled to network 1008. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 1028 may allow communication of data (e.g., between the manageability engine 1026 and the data center management platform 1006) associated with management and monitoring functions performed by manageability engine 1026. In various embodiments, manageability engine 1026 may utilize elements (e.g., one or more NICs) of communication interfaces 1028 to report the telemetry data (e.g., to system management platform 1006) in order to reserve usage of NICs of communication interface 1018 for operations associated with workloads performed by platform logic 1010.

Switches 1030 may couple to various ports (e.g., provided by NICs) of communication interface 1028 and may switch data between these ports and various components of chipset 1016 (e.g., one or more Peripheral Component Interconnect Express (PCIe) lanes coupled to CPUs 1012). Switches 1030 may be a physical or virtual (i.e., software) switch.

Platform logic 1010 may include an additional communication interface 1018. Similar to communication interfaces 1028, communication interfaces 1018 may be used for the communication of signaling and/or data between platform logic 1010 and one or more networks 1008 and one or more devices coupled to the network 1008. For example, communication interface 1018 may be used to send and receive network traffic such as data packets. In a particular embodiment, communication interfaces 1018 comprise one or more physical NICs. These NICs may enable communication between any suitable element of platform logic 1010 (e.g., CPUs 1012 or memory 1014) and another device coupled to network 1008 (e.g., elements of other platforms or remote computing devices coupled to network 1008 through one or more networks).

Platform logic 1010 may receive and perform any suitable types of workloads. A workload may include any request to utilize one or more resources of platform logic 1010, such as one or more cores or associated logic. For example, a workload may comprise a request to instantiate a software component, such as an I/O device driver 1024 or guest system 1022; a request to process a network packet received from a virtual machine 1032 or device external to platform 1002A (such as a network node coupled to network 1008); a request to execute a process or thread associated with a guest system 1022, an application running on platform 1002A, a hypervisor 1020 or other operating system running on platform 1002A; or other suitable processing request.

A virtual machine 1032 may emulate a computer system with its own dedicated hardware. A virtual machine 1032 may run a guest operating system on top of the hypervisor 1020. The components of platform logic 1010 (e.g., CPUs 1012, memory 1014, chipset 1016, and communication interface 1018) may be virtualized such that it appears to the guest operating system that the virtual machine 1032 has its own dedicated components.

A virtual machine 1032 may include a virtualized NIC (vNIC), which is used by the virtual machine as its network interface. A vNIC may be assigned a media access control (MAC) address or other identifier, thus allowing multiple virtual machines 1032 to be individually addressable in a network.

VNF 1034 may comprise a software implementation of a functional building block with defined interfaces and behavior that can be deployed in a virtualized infrastructure. In particular embodiments, a VNF 1034 may include one or more virtual machines 1032 that collectively provide specific functionalities (e.g., WAN optimization, virtual private network (VPN) termination, firewall operations, load balancing operations, security functions, etcetera). A VNF 1034 running on platform logic 1010 may provide the same functionality as traditional network components implemented through dedicated hardware. For example, a VNF 1034 may include components to perform any suitable network function virtualization (NFV) workloads, such as virtualized evolved packet core (vEPC) components, mobility management entities, 3rd Generation Partnership Project (3GPP) control and data plane components, etc.

SFC 1036 is a group of VNFs 1034 organized as a chain to perform a series of operations, such as network packet processing operations. Service function chaining may provide the ability to define an ordered list of network services (e.g. firewalls, load balancers) that are stitched together in the network to create a service chain.

A hypervisor 1020 (also known as a virtual machine monitor) may comprise logic to create and run guest systems 1022. The hypervisor 1020 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 1010. Services of hypervisor 1020 may be provided by virtualizing in software or through hardware assisted resources that require minimal software intervention, or both. Multiple instances of a variety of guest operating systems may be managed by the hypervisor 1020. Each platform 1002 may have a separate instantiation of a hypervisor 1020.

Hypervisor 1020 may be a native or bare metal hypervisor that runs directly on platform logic 1010 to control the platform logic and manage the guest operating systems. Alternatively, hypervisor 1020 may be a hosted hypervisor that runs on a host operating system and abstracts the guest operating systems from the host operating system. Hypervisor 1020 may include a virtual switch 1038 that may provide virtual switching and/or routing functions to virtual machines of guest systems 1022. The virtual switch 1038 may comprise a logical switching fabric that couples the vNICs of the virtual machines 1032 to each other, thus creating a virtual network through which virtual machines may communicate with each other.

Virtual switch 1038 may comprise a software element that is executed using components of platform logic 1010. In various embodiments, hypervisor 1020 may be in communication with any suitable entity (e.g., a software defined networking controller) which may cause hypervisor 1020 to reconfigure the parameters of virtual switch 1038 in response to changing conditions in platform 1002 (e.g., the addition or deletion of virtual machines 1032 or identification of optimizations that may be made to enhance performance of the platform).

Hypervisor 1020 may also include resource allocation logic 1044, which may include logic for determining allocation of platform resources based on the telemetry data (which may include stress information). Resource allocation logic 1044 may also include logic for communicating with various components of platform logic 1010 entities of platform 1002A to implement such optimization, such as components of platform logic 1010.

Any suitable logic may make one or more of these optimization decisions. For example, system management platform 1006; resource allocation logic 1044 of hypervisor 1020 or other operating system; or other logic of computer platform 1002A may be capable of making such decisions. In various embodiments, the system management platform 1006 may receive telemetry data from and manage workload placement across multiple platforms 1002. The system management platform 1006 may communicate with hypervisors 1020 (e.g., in an out-of-band manner) or other operating systems of the various platforms 1002 to implement workload placements directed by the system management platform.

The elements of platform logic 1010 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 1002A may be coupled together in any suitable manner such as through one or more networks 1008. A network 1008 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 11:
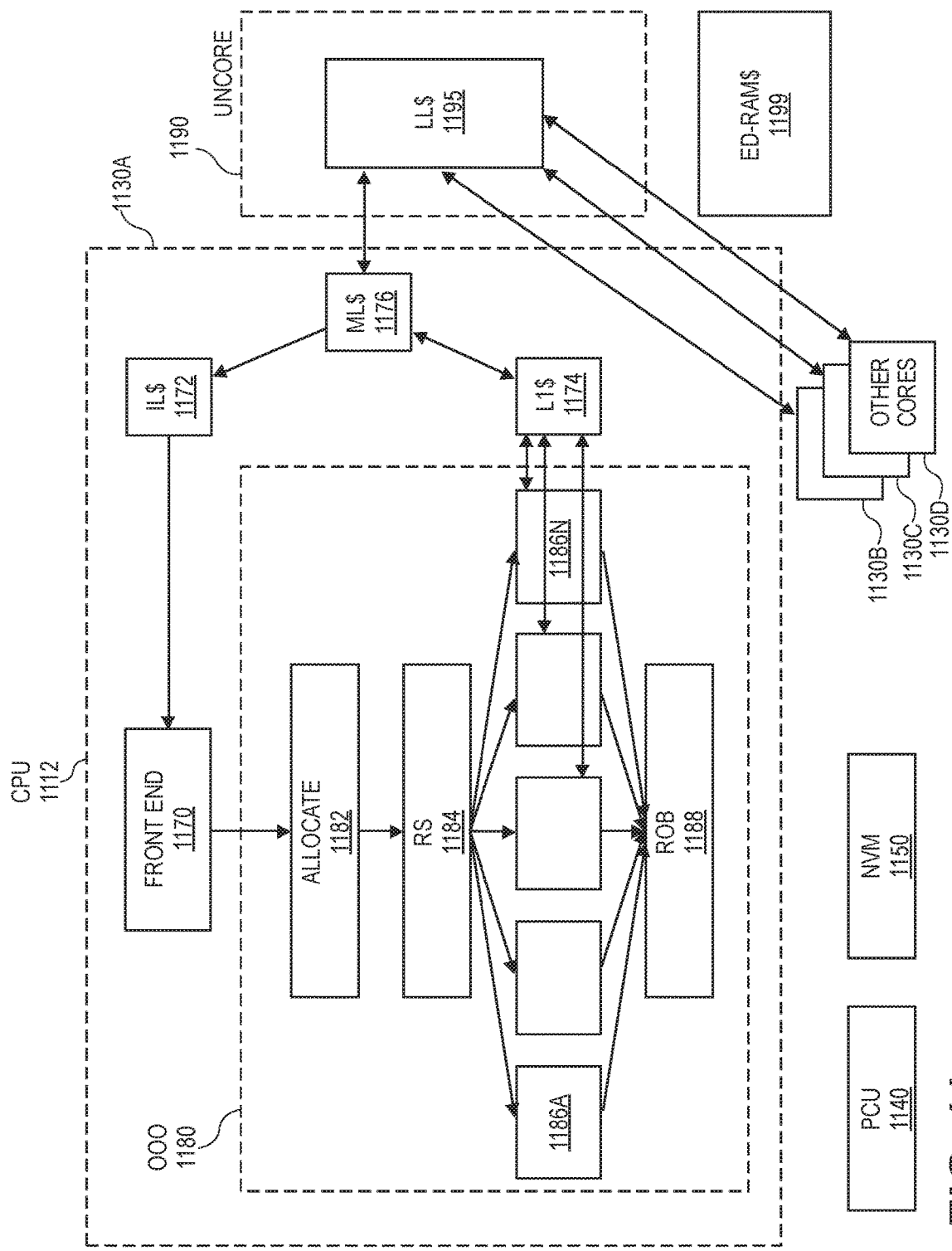
FIG. 11 is a block diagram of a central processing unit (CPU).

FIG. 11 illustrates a block diagram of a CPU 1112. In at least some embodiments, CPU 1112 may be configured or adapted to provide detection of user-facing camera obstruction, according to the teachings of the present specification.

Although CPU 1112 depicts a particular configuration, the cores and other components of CPU 1112 may be arranged in any suitable manner. CPU 1112 may comprise any processor or processing device, such as a microprocessor, an embedded processor, a digital signal processor (DSP), a network processor, an application processor, a co-processor, an SoC, or other device to execute code. CPU 1112, in the depicted embodiment, includes four processing elements (cores 1130 in the depicted embodiment), which may include asymmetric processing elements or symmetric processing elements. However, CPU 1112 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 1130A includes an out-of-order processor that has a front end unit 1170 used to fetch incoming instructions, perform various processing (e.g. caching, decoding, branch predicting, etc.) and passing instructions/operations along to an out-of-order (OOO) engine. The OOO engine performs further processing on decoded instructions.

A front end 1170 may include a decode module coupled to fetch logic to decode fetched elements. Fetch logic, in one embodiment, includes individual sequencers associated with thread slots of cores 1130. Usually a core 1130 is associated with a first ISA, which defines/specifies instructions executable on core 1130. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 1130, in one embodiment, recognize the same ISA (or a subset thereof). Alternatively, in a heterogeneous core environment, a decoder of one or more cores (e.g., core 1130B) may recognize a second ISA (either a subset of the first ISA or a distinct ISA).

In the embodiment depicted, the OOO engine includes an allocate unit 1182 to receive decoded instructions, which may be in the form of one or more micro-instructions or uops, from front end unit 1170, and allocate them to appropriate resources such as registers and so forth. Next, the instructions are provided to a reservation station 1184, which reserves resources and schedules them for execution on one of a plurality of execution units 1186A-1186N. Various types of execution units may be present, including, for example, arithmetic logic units (ALUs), load and store units, vector processing units (VPUs), floating point execution units, among others. Results from these different execution units are provided to a reorder buffer (ROB) 1188, which take unordered results and return them to correct program order.

In the embodiment depicted, both front end unit 1170 and OOO engine 1180 are coupled to different levels of a memory hierarchy. This memory hierarchy may include various levels of cache. The cache is a fast memory structure that is often multilayered. In common practice, cache is much faster than main memory (often two to three orders of magnitude faster), and includes cache ways that map to address spaces within main memory. Cache design may be driven by the principle that faster is generally more expensive, and larger is generally slower. Thus, in some cases, cache is divided into multiple levels. For example, a small, very fast, and relatively expensive level 1 (L1) cache may service an individual core. A larger, somewhat less expensive, but also slower layer 2 (L2) cache may service a plurality of cores within the same CPU socket. An even larger, slower, and less expensive layer 3 (L3) cache (also known as "last level cache" (LLC)) may be located on the motherboard, and may service multiple CPU sockets within the same system. These are illustrated as nonlimiting examples only, and it should be understood that other cache configurations are also possible.

Specifically shown is an instruction level cache 1172, that in turn couples to a mid-level cache 1176, that in turn couples to an LLC 1195. In one embodiment, LLC 1195 is implemented in an on-chip (sometimes referred to as uncore) unit 1190. Uncore 1190 may communicate with system memory 1199, which, in the illustrated embodiment, is implemented via embedded DRAM (eDRAM). The various execution units 1186 within OOO engine 1180 are in communication with a first level cache 1174 that also is in communication with mid-level cache 1176. Additional cores 1130B-1130D may couple to LLC 1195 as well. L1 is on the individual core, L2 services multiple cores, and L3 is on the motherboard.

In particular embodiments, uncore 1190 may be in a voltage domain and/or a frequency domain that is separate from voltage domains and/or frequency domains of the cores. That is, uncore 1190 may be powered by a supply voltage that is different from the supply voltages used to power the cores and/or may operate at a frequency that is different from the operating frequencies of the cores.

CPU 1112 may also include a power control unit (PCU) 1140. In various embodiments, PCU 1140 may control the supply voltages and the operating frequencies applied to each of the cores (on a per-core basis) and to the uncore. PCU 1140 may also instruct a core or uncore to enter an idle state (where no voltage and clock are supplied) when not performing a workload.

In various embodiments, PCU 1140 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 1140 may detect stress characteristics at any suitable interval.

In various embodiments, PCU 1140 is a component that is discrete from the cores 1130. In particular embodiments, PCU 1140 runs at a clock frequency that is different from the clock frequencies used by cores 1130. In some embodiments where the PCU is a microcontroller, PCU 1140 executes instructions according to an ISA that is different from an ISA used by cores 1130.

In various embodiments, CPU 1112 may also include a non-volatile memory 1150 to store stress information (such as stress characteristics, incremental stress values, accumulated stress values, stress accumulation rates, or other stress information) associated with cores 1130 or uncore 1190, such that when power is lost, the stress information is maintained.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid state drive, a flash memory, or other non-volatile medium. A computer-readable medium could also include a medium such as a ROM, a field-programmable gate array (FPGA) or application-specific integrated circuit (ASIC) configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in an SoC, including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

The following examples are provided by way of illustration.

There is disclosed in one example a computing apparatus, comprising: a main board comprising a processor and memory; a user-facing (UF) camera comprising an auto-exposure (AE) circuit; an ambient light sensor (ALS); and a power management module communicatively coupled to the UF camera and the ALS, and including logic to detect a light input mismatch between the ALS and the AE and responsive to the detection, disable a power management function of the power management module.

There is further disclosed an example computing apparatus, wherein the power management module is a companion die.

There is further disclosed an example computing apparatus, wherein the companion die lacks direct access to the memory.

There is further disclosed an example computing apparatus, wherein the power management engine comprises executable software instructions encoded within the memory.

There is further disclosed an example computing apparatus, wherein the power management engine comprises hardened security and privacy controls for the UF camera.

There is further disclosed an example computing apparatus, wherein the security and privacy controls comprise a hardware switch to disable at least some functionality of the UF camera.

There is further disclosed an example computing apparatus, further comprising an integrated mechanical camera blocker including an integrated block sensor, wherein the power management module comprises logic to determine that the integrated block sensor is in a blocked state, and to disable a power management function.

There is further disclosed an example computing apparatus, wherein the power management function includes an auto-dim function.

There is further disclosed an example computing apparatus, wherein the power management function includes an auto-lock function.

There is further disclosed an example computing apparatus, further comprising instructions encoded within the memory to provide a user notification of the disabling of the power management function.

There is further disclosed an example computing apparatus, wherein the instructions are further to receive a user preference to disable future notifications.

There is further disclosed an example computing apparatus, wherein the user notification is a pop-up notification.

There is further disclosed an example computing apparatus, wherein the notification further comprises an audible notification.

There is further disclosed an example computing apparatus, further comprising a user-visible notification light to indicate that the power management function is disabled.

There is further disclosed an example computing apparatus, wherein the notification light is a light emitting diode (LED).

There is further disclosed an example computing apparatus, wherein the LED is a stylized LED.

There is further disclosed an example computing apparatus, wherein the stylized LED is a representation of a camera.

There is further disclosed an example computing apparatus, wherein the LED is bezel mounted.

There is further disclosed an example computing apparatus, wherein the LED is a keyboard LED.

There is also disclosed an example companion die for use in a computing platform, comprising: a sensor hub connection to communicatively couple to an ambient light sensor (ALS) and to receive from the ALS an ambient light value; a camera connection to communicatively couple to a user-facing camera and to receive camera image data and auto-exposure (AE) level data; an artificial intelligence (AI) module to provide power management responsive to a user's presence and attentiveness as inferred from camera image data; and circuitry and logic to compute a correlation between the AE level data and the ambient light value, and to modify power management of the AI module upon detecting that the AE level data and the ambient light value correlate poorly.

There is further disclosed an example companion die, wherein correlating comprises converting AE level data to ambient light value units.

There is further disclosed an example companion die, wherein correlating comprises converting the ambient light value to AE level data units.

There is further disclosed an example companion die, wherein correlating comprises converting the ambient light value and the AE level data to like intermediate units.

There is further disclosed an example companion die, wherein the sensor hub connection is an inter-integrated circuit (I2C) connection.

There is further disclosed an example companion die, wherein the camera connection is a D-PHY or M-PHY connection.

There is further disclosed an example companion die, further comprising a selector to permit or block camera data to an off-die integrated power unit (IPU).

There is further disclosed an example companion die, further comprising hardened privacy and security controls to provide user control of the companion die's operation of the user-facing camera.

There is further disclosed an example companion die, further comprising a user presence engine to compute user presence.

There is further disclosed an example companion die, further comprising a face presence engine to compute a facial presence.

There is further disclosed an example companion die, wherein the face presence engine is further to compute the user's attentiveness.

There is further disclosed an example companion die, further comprising a face detect engine.

There is further disclosed an example companion die, wherein the AI is to provide power management according to a power management policy.

There is further disclosed an example companion die, wherein modifying the power management comprises modifying the power management policy.

There is also disclosed an example computer-implemented method of providing power management, comprising: receiving a power management policy, comprising a policy to provide power management behavior according to a user's presence and attentiveness as measured by a user-facing camera; receiving auto-exposure (AE) data for the user-facing camera; receiving ambient light data; determining that the ambient light data does not correlate to the auto-exposure data; and modifying the power management policy according to the determining.

There is further disclosed an example method, wherein correlating comprises converting the AE data to ambient light value units.

There is further disclosed an example method, wherein correlating comprises converting the ambient light data to AE data units.

There is further disclosed an example method, wherein correlating comprises converting the ambient light data and the AE data to like intermediate units.

There is further disclosed an example method, wherein the power management policy comprises wake on face.

There is further disclosed an example method, wherein the power management policy comprises adaptive dimming.

There is further disclosed an example method, wherein the power management policy comprises no lock on presence.

There is further disclosed an example method, wherein the power management policy comprises lock on absence.

There is further disclosed an example method, wherein the power management policy comprises presence-based plug-and-play.

What is claimed is:

1. A computing apparatus, comprising:
    a main board comprising a processor and memory;
    a user-facing (UF) camera comprising an auto-exposure (AE) circuit;
    an ambient light sensor (ALS); and
    a power management circuit communicatively coupled to the UF camera and the ALS, the power management circuit including circuitry to instruct a motherboard of the computing apparatus to enter a power mode according to an input from the UF camera, and further including circuitry to detect a light input mismatch between the ALS and the AE and responsive to the detection, disable a power management feature of the motherboard.

2. The computing apparatus of claim 1, wherein the power management circuit is a companion die.

3. The computing apparatus of claim 2, wherein the companion die lacks direct access to the memory.

4. The computing apparatus of claim 1, wherein the power management circuit comprises executable software instructions encoded within the memory.

5. The computing apparatus of claim 1, wherein the power management circuit comprises enhanced security and privacy controls for the UF camera.

6. The computing apparatus of claim 5, wherein the enhanced security and privacy controls comprise a hardware switch to disable at least some functionality of the UF camera.

7. The computing apparatus of claim 1, further comprising an integrated mechanical camera blocker including an integrated block sensor, wherein the power management circuit comprises logic to determine that the integrated block sensor is in a blocked state, and to disable a power management function.

8. The computing apparatus of claim 1, wherein the power management feature includes an auto-dim function.

9. The computing apparatus of claim 1, wherein the power management feature includes an auto-lock function.

10. The computing apparatus of claim 1, further comprising instructions encoded within the memory to provide a user notification of the disabling of the power management feature.

11. The computing apparatus of claim 1, further comprising a user-visible notification light to indicate that the power management feature is disabled.

12. A companion die for use in a computing platform, comprising:
    a sensor hub connection to communicatively couple to an ambient light sensor (ALS) and to receive from the ALS an ambient light value;
    a camera connection to communicatively couple to a user-facing (UF) camera and to receive camera image data and auto-exposure (AE) level data;
    an artificial intelligence (AI) circuit to provide power management responsive to a user's presence and attentiveness as inferred from camera image data, the AI circuit including circuitry to instruct a motherboard of the companion die to enter a power mode according to an input from the UF camera; and
    circuitry to compute a correlation between the AE level data and the ambient light value, and to modify a power management feature of the motherboard upon detecting that the AE level data and the ambient light value do not substantially correlate.

13. The companion die of claim 12, wherein correlating comprises converting AE level data to ambient light value units.

14. The companion die of claim 12, wherein correlating comprises converting the ambient light value to AE level data units.

15. The companion die of claim 12, wherein correlating comprises converting the ambient light value and the AE level data to like intermediate units.

16. The companion die of claim 12, wherein the sensor hub connection is an inter-integrated circuit (I2C) connection.

17. The companion die of claim 12, wherein the camera connection is a D-PHY or M-PHY connection.

18. The companion die of claim 12, further comprising a selector to permit or block camera data to an off-die integrated power unit (IPU).

19. A computer-implemented method of providing power management, comprising:
    receiving a power management policy, comprising a policy to provide power management to a system motherboard according to a user's presence and attentiveness as measured by a user-facing (UF) camera;
    receiving auto-exposure (AE) data for the UF camera;
    receiving ambient light data;
    determining that the ambient light data does not correlate to the AE data; and
    modifying the power management policy according to the determining; and
    entering a power mode according to the power management policy.

20. The method of claim 19, wherein the power management policy comprises wake on face.

* * * * *